United States Patent [19]
Chandler

[11] Patent Number: 4,983,030
[45] Date of Patent: Jan. 8, 1991

[54] RETAINING MECHANISM FOR EYEGLASSES HAVING INTERCHANGEABLE LENSES

[75] Inventor: Roy L. Chandler, Burleson, Tex.
[73] Assignee: Up To Date, Inc., Arlington, Tex.
[21] Appl. No.: 106,405
[22] Filed: Oct. 8, 1987
[51] Int. Cl.$^5$ .......................... G02C 1/00; G02C 5/00
[52] U.S. Cl. ....................................... 351/86; 351/154
[58] Field of Search ............... 351/86, 106, 154, 135, 351/143, 148, 151, 152

[56] References Cited

U.S. PATENT DOCUMENTS

| | | | |
|---|---|---|---|
| 2,452,159 | 10/1948 | Small | 351/86 |
| 2,574,839 | 11/1951 | Pelzer | 351/86 |
| 2,738,709 | 3/1956 | Matthews et al. | 351/86 |
| 4,176,921 | 12/1979 | Matthias | 351/106 |
| 4,304,469 | 12/1981 | Solomon | 351/121 |
| 4,357,080 | 11/1982 | Solomon | 351/86 |
| 4,504,127 | 3/1985 | Cottet | 351/86 |
| 4,523,819 | 6/1985 | Dianitsche et al. | 351/106 |

*Primary Examiner*—Rodney B. Bovernick
*Attorney, Agent, or Firm*—Charles W. McHugh

[57] ABSTRACT

An eyeglass construction characterized by having a conventional frame with a pair of rim supports for receiving and holding a pair of lenses. The rim supports have a plurality of fixed prongs distributed around the rims at points that are remote from a bridge that connects the tops of the two rim supports. Affixed to the frame, usually near the bridge, is a retaining mechanism that includes a housing having two open ends. A wire-like member is adapted to protrude out of each of the two open ends of the housing for a distance which is adequate to cooperate with the fixed prongs for firmly holding the lenses in the rim supports. Whenever it is desired (or necessary) to replace one or both of the lenses, the appropriate wire-like member is retracted into the housing, such that the adjacent lens may be manipulated—usually by slightly rotating it—in order to free it from the rim support. The wire-like retaining member is biased in its extended position by a bias member having the characteristics of a spring. In the preferred embodiment, the wire-like retaining member and the bias member are integrally formed from the same piece of wire. One end of such a combination member may also be configured to engage some irregularity in the housing (such as an aperture), so that it may function as a positive lock to preclude accidental movement of the wire-like member. With such a lock, a given lens will be removable from the frame only it is desired to replace it with another lens, which other lens may be a different color or shade, etc. The preferred design for the latching mechanism will only permit one lens to be removed at a time, so that a second lens does not accidentially fall to the ground and get scratched while the owner is concentrating his or her attention on replacing a first lens.

19 Claims, 1 Drawing Sheet

U.S. Patent    Jan. 8, 1991    4,983,030
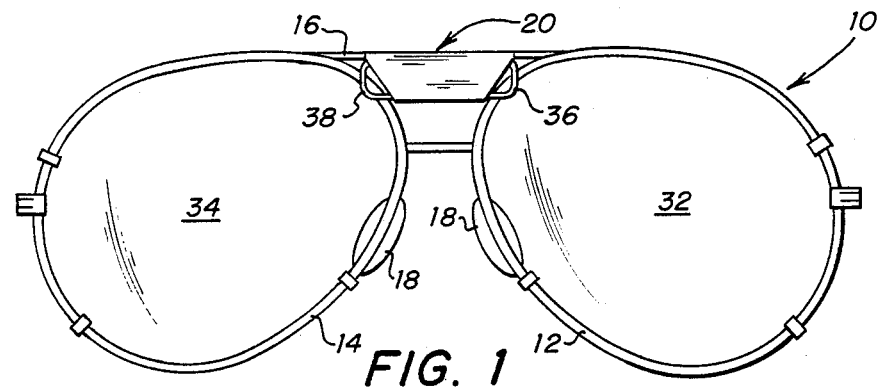
FIG. 1
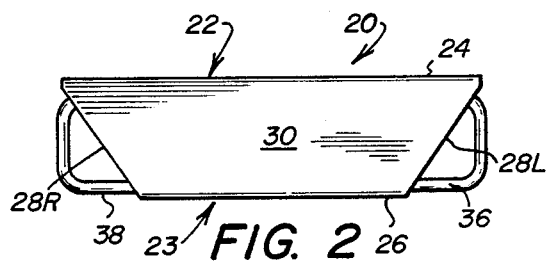
FIG. 2
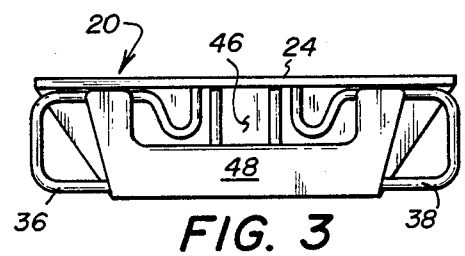
FIG. 3
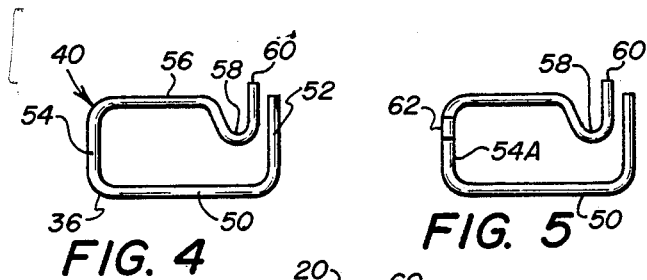
FIG. 4
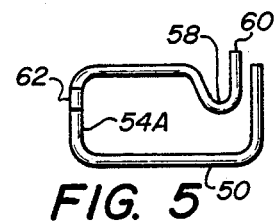
FIG. 5
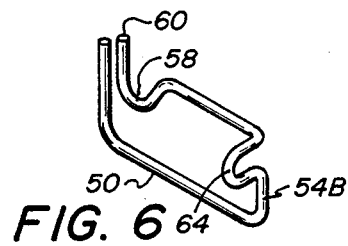
FIG. 6
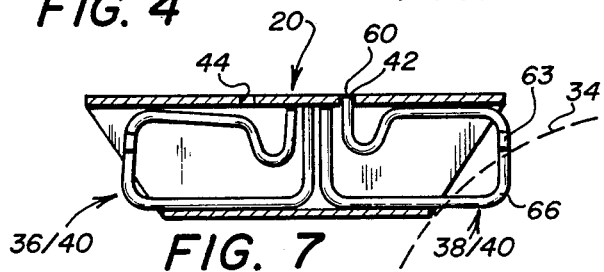
FIG. 7
FIG. 10
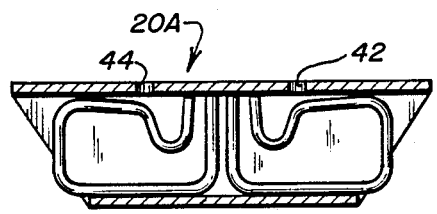
FIG. 8
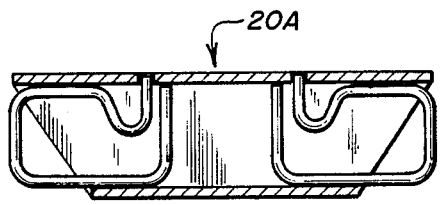
FIG. 9
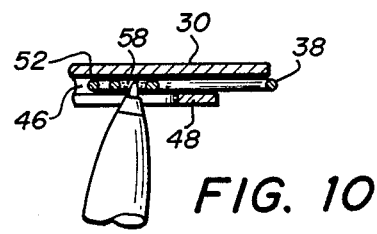
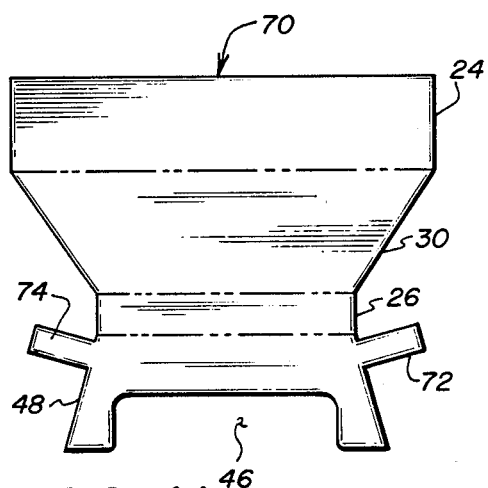
FIG. 11

RETAINING MECHANISM FOR EYEGLASSES HAVING INTERCHANGEABLE LENSES

BACKGROUND OF THE INVENTION

This invention relates generally to eyeglasses or spectacles; more particularly it relates to eyeglasses having interchangeable lenses of the type that the owner can change or replace without the necessity of obtaining skilled assistance.

The concept of permitting owners of eyeglasses to change their own lenses is now established in many parts of the world. This concept has been embodied in eyeglasses that have been effectively marketed by companies such as Optyl Eyewear Fashion International Corporation under the "Carrera" trademark; they are made in accordance with the teachings of U.S. Pat. No. 4,176,921 to Matthias entitled "Eyeglasses Having Removable Lenses." The most popular usage of the Carrera-style eyeglasses is in the form of sunglasses and the like, wherein plain, mirrored or tinted lenses (e.g., smoke, green, yellow and grey) are selectively interchanged by the owner, depending upon lighting conditions and whatever activity the owner has in mind. However, this particular style of eyewear has one characteristic which at least some people find to be a liability, namely, a single latching mechanism is effective to unlatch both of the lenses simultaneously. The result is that a retaining mechanism in accordance with the Matthias patent could cause one lens to be accidentally dropped while the owner's attention is being focused on removing and replacing an adjacent lens.

Another construction for interchangeable lenses is illustrated in U.S. Pat. No. 4,504,127 to Cottet entitled "Frame Front For Eyeglasses Permitting Interchangeability Of Lenses". This patent does teach that each of two lenses ought to be capable of being individually removed from their respective sockets or cavities; but it is reported—in practice—that deflecting the main bridge member usually causes both lenses to fall out simultaneously. If these reports are valid, this may be an example of the widely recognized "truth" that the average consumer does not always read directions before trying to use a new product, nor does the average consumer possess the dexterity or faculties that design engineers do. So what may work nicely in the laboratory will not always work in the field—when amateurs get hold of something. But giving the Cottet device the benefit of any doubt, and assuming that it can be made to regularly and reliably release only one lens at a time, it does so at the expense of using a unique and unusually strong main bridge member; otherwise the bridge member would be subject to breaking after a disappointingly few changes of the lenses.

Another device of the prior art is shown in U.S. Pat. No. 4,523,819 to Dianitsch and Pschebezin entitled "Eyeglasses With Exchangeable Lenses." This device reportedly has the advantage of being usable with eyeglasses having only partial rims. However, it achieves its results with a latching mechanism which appears to be so sophisticated as to almost ensure that it could never be made with manufacturing techniques that are economical and adapted to ordinary mass production. So when a large manufacturer is searching for a reliable mechanism for use in meeting the world's needs for sunglasses and other eyeglasses having interchangeable lenses, it is likely that something more simple would be desired. It is an object of this invention to provide such a simple—but strong, attractive and dependable—device.

It is another object to provide an eyeglass mechanism in which both lenses may be selectively replaced by the owner—but only one at a time.

Another object is to provide a retaining mechanism which can be combined expeditiously with a wide variety of basic eyeglass frames, so that a manufacturer of eyeglasses need not be forced to create highly specialized and unique frames in order to employ a retaining mechanism for a pair of lenses.

Still another object is to provide a retaining mechanism which has a relatively short profile—in a vertical direction, and which can be placed at the top of an eyeglass frame without extending so far downward that the mechanism might interfere with the wearer's vision.

These and other objects will be apparent from a careful reading of the specification and the claims appended thereto, with appropriate reference to the drawings provided herewith.

DESCRIPTION OF THE FIGURES OF THE DRAWING

FIG. 1 is a front elevational view of a pair of eyeglasses having a frame and a pair of selectively removable lenses which are held in the frame by use of a latching mechanism affixed to a bridge member at the top of the frame;

FIG. 2 is a front elevational view of a latching mechanism as shown in FIG. 1;

FIG. 3 is a rear elevational view of the latching mechanism shown in FIG. 2, with both of the wire-like members being shown in their fully extended position where they are effective for holding their respective lenses in the frame rims;

FIG. 4 is a perspective view of an element which is advantageously made in accordance with the teachings herein to accomplish three major functions—to be described hereinafter;

FIG. 5 is an alternate embodiment of the member shown in FIG. 4, which is uniquely configured for holding the left lens in a pair of eyeglasses;

FIG. 6 is a perspective view of an element which is functionally equivalent to that shown in FIG. 5, but which is uniquely configured to hold a right lens in a pair of eyeglasses;

FIG. 7 is a sectional view taken through the latching mechanism and showing both the extended and retracted positions for exemplary wire-like members;

FIG. 8 is a cross-sectional view of an alternate embodiment of a latching mechanism in which both of the wire-like members may be simultaneously retracted—if desired;

FIG. 9 is a cross-sectional view showing the embodiment of FIG. 8 with both the wire-like members being extended and locked;

FIG. 10 is a fragmentary top view showing engagement of a "tool" in the form of the point of a ball point pen—which is in a position to deflect the biasing means downward so that the lock can be disengaged; and FIG. 11 is a plan view of an exemplary body of sheet metal or the like which can be bent to produce the housing shown in FIGS. 2 and 3.

BRIEF DESCRIPTION OF THE INVENTION

In brief, this invention constitutes a retaining mechanism that is adapted for selectively holding lenses in eyeglasses, wherein the mechanism is centrally located near the bridge that connects the tops of two eyeglass rims. The retaining mechanism includes a housing having a generally elongated body. The housing may also be described as having a top, a bottom, two open ends, and an open interior which extends between the two open ends. A wire-like member projects outwardly from each of the two open ends of the housing—for a short distance that is sufficient to overlie an edge of a lens and to retain the lens in a rim-shaped cavity associated with the eyeglass frame. A few fixed prongs (or hook-shaped pins) are positioned around each cavity to assist the wire-like member in holding each of the lenses securely within its respective cavity. Each of the wire-like members is individually and temporarily retractable to a position inside the housing so that a lens associated with the retracted member may be manually removed from the lens cavity.

A biasing means is provided for holding each of the two wire-like members in its outwardly projecting position. In the preferred embodiment, the biasing means is a resilient wire that is integrally formed with each of the wire-like retaining members. By judiciously configuring the biasing means so as to permit controlled deflection, and by using a resilient material to form the wire-like member, both of these elements can be combined into a single part. A very simple "tool," such as the pointed tip of a ball-point pen, may be used to deflect the biasing means so that a given wire-like member may be retracted. After a given lens has been released and removed, and after a replacement lens has been supplied, the wire-like member is simply returned to its outwardly projecting position by pushing it away from the center with a pin or the like; the replacement lens will then be locked in place by virtue of being wedged between a plurality of fixed prongs and the wire-like member.

DETAILED DESCRIPTION OF THE PREFERRED EMBODIMENTS

Referring initially to FIG. 1, a pair of eyeglasses is shown with a conventional pair of rims 12, 14 which form a part of a frame 10, and an upper bridge member 16 which rigidly joins the two rims at their tops. The rims 12, 14 also have affixed thereto conventional nose pads 18 for supporting the eyeglasses above the nose. Rigidly connected to the top bridge 16 is a new latching mechanism 20 in accordance with this invention. As will be readily apparent hereinafter, the entire mechanism 20 is compactly contained in a relatively small space, and there is no requirement that a special frame be utilized. Hence, the self-contained mechanism 20 disclosed herein is adapted for use with a wide variety of frames, although it is true that the mechanism will probably find more utility with frames that are made of metal.

Referring additionally to FIG. 2, which is a frontal view of the latching mechanism illustrated at an enlarged size, the mechanism 20 includes a housing 22 having a generally elongated body 23 with a top 24, a bottom 26, and right and left ends 28R, 28L. The top 24 and bottom 26 are joined by a portion of the body which will be referred to as the face plate 30; the exterior surface of the face plate may be plain or decorated, depending upon the personal preference of the designer or user. Because the outer surface of the face plate 30 may be relatively flat and smooth, it provides an excellent space for displaying an advertisement, company logo, a trademark or any other desired indicia—any of which would be clearly visible to nearby observers. The right and left edges 28R, 28L of the face plate 30 are preferably cut diagonally so that the plate appears like a regular trapezoid, with its longer "base" as the top. The diagonally cut corners provide an advantageous clearance area for facilitating the selective removal of lenses 32, 34.

Protruding outwardly from the open ends of the generally elongated body 23 are two wire-like members 36, 38. These two members 36, 38 project outwardly for a distance that is sufficient to overlie an edge of and thereby help retain a respective one of the lenses 32, 34 in a groove associated with each of the rims 12, 14—which groove essentially defines a lens cavity. Each of the wire-like members 36, 38 is temporarily retractable to a position inside the housing 22, such that the particular lens that is associated with a retracted member may be manually removed from its associated rim cavity.

A suitable wire-like member 36 or 38 may be advantageously formed from wire having a diameter of about 0.04 inch; such a wire may be thought of as being similar to a small wire paper clip, and it will readily slide along the smooth bottom of the housing 22. A suitable material for the wire-like members 36, 38 is music wire, which has the desired strength and physical characteristics and which may be readily bent to shape. Turning next to FIG. 3, the back side of the retaining mechanism 20 is shown with the wire-like members 36, 38 in their fully extended position. To ensure that the wire-like members 36, 38 are retained in these extended latching positions for as long as the lenses are to be locked in the frame 10, a biasing means is provided for individually holding each of the wire-like members in its outwardly projecting position. At least a portion of each biasing means is temporarily deflectible so that a wire-like member 36, 38 may be selectively retracted. When a wire-like member 36, 38 is retracted inside (or almost inside) the housing 22, and said member lies interiorly of (or at least very near) a respective end 28R, 28L, then a lens 32 or 34 may be removed from the frame 10 and replaced, cleaned, or polished at will.

In its preferred embodiment, a biasing means for the retaining mechanism 20 includes a biasing member 40 which—by its size, location and resilience—is adapted to engage some part of the housing 22, e.g., aperture 42 or 44 in the top 24. For economy in manufacture and convenience in use, the biasing member 40 is a resilient wire that is integrally formed with one of the wire-like members 36, 38. The resiliency of a biasing member 40 is such as to cause a suitably configured end of the biasing member to engage an aperture (or some other irregularity) in the interior surface of the generally rectangular housing 22, but only when the wire-like member is in its outwardly projecting position. This positive engagement of an upwardly biased wire end with an aperture in the top 24 has both the certainty and rigidity as to to justify categorizing it as a "lock" for the wire-like members 36, 38, preventing movement of those members until such time as movement is definitely wanted. Although perhaps not susceptible of easy illustration in the drawings, the motion of unlocking the mechanism disclosed herein can be said to involve a smooth L-shaped movement that is realized from application of a "pull down and push over" force that is manually applied to a U-shaped or J-shaped part of the wire that is exposed through a window 46 in the housing back plate 48.

While in its retracted position within the housing 22, the biasing member 40 will naturally exert a dragging or friction force on the roof of the interior cavity of the housing 22; and this will normally preclude the biasing member from experiencing any unplanned movement. Also, the biasing member 40 is essentially enveloped by and protected from casual contact by the wrap-around body of the housing 22, and there normally will be no extraneous force which might act on the biasing member in an unplanned manner. The only thing that would tend to make the biasing member 40 move within the housing 22 would normally be a planned action on the part of someone who is deliberately acting to return the biasing member from its retracted to its outwardly projecting position. As with its retracting motion, extension is accomplished by inserting a pointed object through the window and pushing on an exposed portion of the biasing member 40. No specialized tool is required to either retract or extend the biasing member 40, and the world is full of pointed objects like ballpoint pens. There should therefore be no problem in finding a suitable "tool" to release either or both of the replaceable lenses.

Referring additionally to FIG. 4, a combination device which satisfies the functions of both the wire-like member and the biasing member is shown in its simplest form, wherein it may be used in a latching mechanism 20 as either a right-hand or a left-hand retaining element. It will be recognized that the bottom, outer corner of this combination device appears exactly like the wire-like element 36 or 38 that was illustrated in FIG. 1, where it extends beyond a diagonal edge of the housing 22. And the part of the device above that corner may be accurately considered to be the major part of the biasing member 40. Where the exact physical limits of biasing element 40 begin and end in this preferred "integral" construction may not be susceptible to easy and quick description; and those limits may not even be capable of very precise determination. This is because depressing the distal end of the biasing member 40 by a small amount may even cause some bending to take place in the corner that has been previously designated as the retaining element 36, 38. But the difficulty of defining the physical limits of biasing element 40 in very simplistic terms is probably of no more than academic interest, anyway, because those persons skilled in the art will surely appreciate the theory behind the biasing construction disclosed herein, and they will be able to duplicate it at the appropriate time.

This combination device (involving elements 36/40 or 38/40) is preferrably made from a wire having both the physical and ornamental characteristics that are desired. If the color of the eyeglass frame 10 is to be a bold black, the wire element is ideally made of so-called music wire that has been zinc plated. If the frame 10 is to be a more dressy, gold color, the element shown in FIG. 4 is ideally made from phosphorous bronze spring material. A suitable size for the wire is about 0.042 inch in diameter, and the phosphorous bronze wires are preferably stress relieved after forming—for about 30 minutes at 325° Fahrenheit.

Each of the "reversible" elements shown in FIG. 4 has a relatively long bottom 50 which is adapted to slide horizontally along the bottom of the latching mechanism 20. Such wire elements are described as "reversible" because they can function as either right-hand or left-hand devices, even though they are not symmetrical. At the right end of the element (in this particular figure) is an upright side piece 52 that is generally parallel to an opposite side piece 54. A top piece 56 is connected at its left end to the side piece 54 and connected at its other end to a U-shaped piece 58. The terminus of piece 58 extends above the top 56, as well as the highest point of side piece 52—when the wire element is at rest. However, the resilience in the wire, and the small gap between U-shaped part 58 and right side 52 permit the U-shaped part to be temporarily deflected (downward), so that terminus 60 is below top 56. Of course, it is this temporary deformation of the wire element that will permit it to cooperate with appropriately sized apertures in the top 24 to achieve the selective latching action of mechanism 20.

The height of upright side piece 52 is significant when a designer is concerned with the rotational stability of the over-all wire element. That is, when there is very little clearance between the top of wire piece 52 and the top of the housing cavity, there will be more insurance against any unwanted rotation of the wire element as a result of external forces exerted by a lens or the like. And the longer the wire element is, the greater will be the assurance that it can be made to translate within the housing 22 without tilting (or rotating). Also, by making a latching element of wire instead of a solid body, and using the wire to peripherally define a functional part, the weight of a given part can be reduced—in comparison to the weight that would be present if the part was not "hollow."

Referring next to FIG. 5 an alternate form of the combination member 36/40 is shown with essentially the same geometry as the element that is shown in FIG. 4. However, this element differs from the more versatile and "reversible" element shown in FIG. 4 in that it has a short segment of wire 62 which is brazed, soldered, welded or otherwise secured to the leg piece 54A. The location of wire segment 62 is established so as to provide a clearance space underneath said wire segment for accomodating a peripheral section of a left lens 32. The purpose of segment 62, when present, is to provide additional insurance for the lens 32—so that it might not be so readily turned or rotated to the point that it might be forced out of a rim 12.

Another configuration for a combination wire-like member 36 and biasing member 40 is shown in FIG. 6. In this figure a short U-shaped bend 64 is added to side piece 54B—in a direction and at an elevation to permit a lens 34 to rest below the protuberance 64 and be blocked against unwanted rotation. Of course, deflecting the parts 58 downward so as to disengage terminus 60 from aperture 42 will unlock the wire element and permit it to be moved toward the center of a retaining mechanism 20. After element 62 or element 64 has been moved away from an associated lens, the lens may be manipulated (usually by rotating it) so that it can be selectively removed from rim 12. Because the wire segment 62 and the protuberance 64 are specific to their respective sides of a latching mechanism, equivalent wire members for the other sides of such a mechanism would have similar protrusions on their "back" sides for holding the opposite lens in place.

Turning next to FIG. 7 a latching mechanism 20 is shown from the rear, with the back of the housing 22 removed for clarity in showing the function of the movable parts, etc. The right member 38/40 is shown in its engaged position, wherein terminus 60 is engaged with an irregularity in the interior surface of the housing, said irregularity being in the form of an aperture in top 24.

The corner 66, where the wire extends beyond the right diagonal edge of the housing, is in a position to cooperate with the fixed prongs on the rim 14 to retain the right lens 34 and prevent it from moving forwardly with respect to the retaining mechanism 20. The wire segment 63 extends backward over a top edge of lens 34 and helps ensure that the lens is not prematurely rotated, such that it might come out of its cavity.

Also shown in FIG. 7 is the left member 36/40 which has been retracted to a position inside the housing 22. It will be seen that the left-hand latching wire has been moved to the right to a position that is past the centerline of the housing 22; and when so positioned, there is not enough room to permit the right-hand member 38/40 to be simultaneously moved to a retracted position. Therefore, it will be seen that a retaining mechanism 20 in accordance with this design will permit one and only one of the wire members to be retracted at a given time, whereby only one lens may be removed and replaced at a given time.

If for some reason it should seem to be desirable that a person be able to remove both lenses simultaneously, the latching mechanism would have to be configured in such a way that the wire-like members are shorter—in a horizontal direction—and the apertures in the body top are spaced further apart, so that both wires might be simultaneously retracted. This embodiment of a latching mechanism 20A is shown in FIGS. 8 and 9, with FIG. 8 showing both of the wire-like members being fully retracted into the housing and FIG. 9 showing them both extended and latched. Of course, either one of the wire-like members may be individually retracted by appropriate deflection of its own distinct spring-like member, such that each lens may be individually released while the other remains locked in its cavity.

While the embodiments disclosed herein have been concerned with a channel-shaped housing whose face is in the shape of a regular trapezoid, it should be appreciated that the two open ends of the housing could be defined by two generally parallel lines. With a more nearly rectangularly shaped face for the "frontal" portion of the retaining mechanism, the outwardly-protruding wire-like members would naturally be shaped with a bend or protuberance that will extend beyond the envelope of the latching mechanism when the locking members are engaged with their respective apertures or the like. With any such embodiment, it need only be verified that a given lens will be secured in its respective cavity by whatever fixed prongs are present—in combination with the selectively retractable wire-like member of the type described herein. And, when the wire-like member is retracted, its associated lens should be removable—either with or without some modest manipulation or rotation.

Referring next to FIG. 11, a sheet metal blank 70 from which the body of the housing 22 can be formed is shown while still in its flat condition. The blank 70 may advantageously be formed from material having a thickness of about 0.025 inch. The various elements of the housing 22 are identified in this figure by the same reference numerals which have been heretofore employed, with the respective elements (e.g., top 24, face plate 30) being separated by the bend lines indicated by the three horizontally oriented and broken lines. Also clearly shown in this figure are the right and left tabs 72, 74 which are subsequently bent so as to be generally parallel to the top 24. When the rearmost edge of the top 24 is brazed, welded or otherwise secured to the upper bridge member of an eyeglass frame, and when the tabs 72, 74 are similarly secured to an adjacent section of the eyeglass rims, the housing 22 will add both strength and rigidity to an eyeglass frame. However, the box-like housing 22 with its relatively large area moment of inertia is not realized by sacrificing aesthetics; so eyeglasses made in accordance with this disclosure will still be sufficiently attractive as to make the latching mechanism 20 appealing to even the most discriminating of designers. In particular it should be noted that the operative parts of the latching mechanism are mostly concealed behind a frontal piece of the housing 22, so the mechanics by which the replaceable lenses are secured in their respecitce supports rims is not immediately apparent to a casual observer.

At the same time that sophisticated designers are contemplating the use of the latching mechanism 20 for their products, the economy of the latching mechanism is such that it could be produced and sold to persons who may have less discretionary money to spend, e.g., teenagers on a modest budget. And while mature adults will almost surely opt for wearing the same color lenses on both sides of the eyeglasses, it would not be surprising to see a teenager walking down the street wearing eyeglasses made in accordance with this disclosure—with the right lens being colored pink and the left lens colored green. The next day, that same teenager can exploit the selective interchangeability of the lenses by expressing his or her individuality, amusing friends and startling adults with yet another incongruous color combination.

While only the preferred embodiments of the invention have been described herein in substantial detail, it should be apparent to those skilled in the art that modifications of various parts of the invention may be accomplished without departing from the spirit of the invention. For example, the preferred technique for employing a short piece of wire which is sized and bent so as to perform three major functions is deemed to be of particular value. This is because it is believed to be especially advantageous to merge three elements into a unitary device so as to satisfy three needs with a single piece of wire: a retaining element for selectively contacting and holding the edge of a lens; a biasing element for holding the retaining element in the correct position; and a locking means for ensuring that the retaining element stays in a predicatable position for as long as seems desirable. But if for some reason it should seem to be preferable to structurally segregate these three functions and accomplish them with three distinct parts instead of one, then it is to be understood that such a construction should be deemed to fall within the scope of those claims which are appended hereto. Thus, the invention should be deemed to be limited only by the following claims.

What is claimed is:

1. A mechanism adapted for cooperation with certain fixed prongs in selectively holding lenses in eyeglasses when the mechanism is mounted on an eyeglass support frame adjacent the bridge, so that the mechanism is adjacent two potentially replaceable lenses, comprising:
   (a) a housing having a generally elongated body with a top, a bottom, and two open ends, and the housing having an interior which is in communication with the two open ends, and the housing having an exterior that is configured to foster connection to the frame of the eyeglasses at the bridge thereof;
   (b) a wire-like member projecting outwardly from each of the two open ends of the housing, each of said wire-like members normally projecting beyond an end of the housing for a distance that is sufficient to retain one of the lenses in a rim cavity associated with the eyeglass frame, and each of said wire-like members being temporarily retractable to a position inside the housing such that the lens associated with the retracted member may be selectively removed from its associated cavity; and (c) biasing means for holding each of the wire-like members in their outwardly projecting positions, and at least a portion of said biasing means being temporarily deflectable so that the wire-like members may be retracted, and a lens being easily removable and replaceable when its associated wire-like member is retracted.

2. The retaining mechanism as claimed in claim 1 wherein the biasing means includes a biasing member which is adapted to engage some part of the housing, and wherein the wire-like member and the biasing member are integrally formed.

3. The retaining mechanism as claimed in claim 1 wherein there is an internal space between the two wire-like members when they are in their outwardly projecting positions, and said internal space is so small that only one of said wire-like members may be moved inwardly to a retracted position at any one time, whereby only one lens may be removed and replaced at a given time.

4. The retaining mechanism as claimed in claim 1 wherein the biasing means includes a resilient member having a locking element which is sized and shaped so as to engage an irregularity in the interior surface of the housing when the wire-like member is in its outwardly projecting position.

5. The retaining mechanism as claimed in claim 4 wherein the locking element on the resilient member constitutes an end of said resilient member, and said end is sized so as to engage an aperture in the top of the housing.

6. The retaining mechanism as claimed in claim 1 wherein each of the housing's two open ends has an outer edge which has a substantial portion which extends diagonally between the top and the bottom of the housing.

7. The retaining mechanism as claimed in claim 1 wherein the housing is generally rectangular and it has an outer surface which is adapted to extend across the bridge of the eyeglass frame in an exposed position, and said outer surface being relatively flat and smooth, whereby a pair of eyeglasses may be personalized by placing any desired indicia on said outer surface, such that the indicia will be visible to nearby observers.

8. The retaining mechanism as claimed in claim 1 wherein the major part of the housing is formed by a single piece of thin sheet metal that is shaped in the form of a channel so as to provide in a single piece the combination of the front, the top and the bottom of the housing.

9. The retaining mechanism as described in claim 1 wherein the back side of the housing has been at least partially cut away so as to define a window that exposes a portion of the biasing means, so as to render said portion susceptible to being readily deflectable by a pointed instrument which is inserted through the window in the back side of the housing.

10. The retaining mechanism as claimed in claim 1 wherein the biasing means includes a distinct spring-like member associated with each of the two lenses of the eyeglasses, and said two spring-like members are independently deflectable, whereby each lens may be individually released while the other lens remains locked in its rim cavity.

11. The retaining mechanism as claimed in claim 1 wherein the biasing means includes a pair of resilient wires, and wherein a respective one of said resilient wires is formed as a unitary piece with one of the wire-like members that projects outwardly from an end of the housing.

12. The retaining mechanism as claimed in claim 1 wherein the two wire-like members are identically formed but are installed in the housing by orienting one so that it faces to the right and the other so that it faces to the left, whereby a single configuration for a nonsymmetrical wire-like member can function at both the right and left sides of the housing for retaining a respective lens in its associated rim cavity.

13. An eyeglass construction comprising:

(a) a frame having a pair of rim supports that are adapted for receiving a pair of lenses, and including a bridge that extends between and connects the two rim supports near the tops thereof;

(b) a plurality of prongs which are distributed around and permanently affixed to the rim supports for partially restraining a lens within a respective one of the rim supports, and all of said prongs being remote from the bridge;

(c) a retaining mechanism including a housing that is fixed to the frame near the bridge thereof, and said retaining mechanism having a retaining member which projects outwardly from each end of the housing and partially into the space defined by a respective rim, and the combination of a given retaining member and those prongs which are associated with a respective rim being serviceable to captively hold a lens that is to be mounted in the eyeglass frame, and the two retaining members being selectively movable from an extended and locking position to a retracted position, and there being sufficient clearance for the controlled removal of a lens when a retaining member is fully retracted, whereby lenses that are installed in the frame may be retained therein for as long as their associated retaining members are maintained in an extended position, and whereby a desired lens may be selectively removed from the eyeglass frame by temporarily retracting the retaining member that is associated with that lens.

14. The eyeglass construction as claimed in claim 13 wherein each one of the retaining members is individually biased so that it will remain in both its retracted and extended positions until it is manually displaced, and the manipulation of one retaining member will not affect the other.

15. The eyeglass construction as claimed in claim 13 wherein the two retaining members are sized with respect to the housing such that only one of the retaining members can be retracted at a given time.

16. The eyeglass construction as claimed in claim 13 and further a spring-biased lock for selectively holding each of the two retaining members in their extending positions.

17. A mechanism for use in conjunction with certain fixed prongs in holding a replaceable lens in the support rim of a pair of eyeglasses, comprising:

(a) a housing fixed to a pair of eyeglasses near the bridge thereof in such a way that the housing is adjacent both of the two lenses, and the housing having an opening at each of two opposite ends;

(b) a slideable element that is associated with and moveable with respect to associated ones of the two open ends of the housing, each of the two slideable elements being slideable between an extended position and a retracted position, and each of the lenses being secured with respect to the support rim when its associated slideable member is in its extended position, and each of the lenses being selectively removeable from its associated support rim when the slideable member is in its retracted position;

(c) a biasing member associated respectively with each of the two slideable members, each biasing member being adapted to hold its associated slideable member in either its extended or its retracted position; and (d) a locking element associated respectively with each of the two slideable members, each locking element being configured to cooperate with a part of the housing for holding its associated slideable element in its extended position.

18. The latching mechanism as claimed in claim 17 wherein the slideable element and the biasing member and the locking element are all integrally formed.

19. The latching mechanism as claimed in claim 18 wherein the integrally formed elements are created from a single piece of rigid wire which is geometrically configured so as to be resilient in only one major direction.

* * * * *